United States Patent [19]

Furtah

[11] 4,066,369

[45] Jan. 3, 1978

[54] OVERRIDE CLIP ASSEMBLY

[75] Inventor: Reginald D. Furtah, Livonia, Mich.

[73] Assignee: Essex Group, Inc., Fort Wayne, Ind.

[21] Appl. No.: 735,309

[22] Filed: Oct. 26, 1976

[51] Int. Cl.² .............................................. F16C 11/06
[52] U.S. Cl. ..................................... 403/115; 403/122; 403/71
[58] Field of Search ............... 403/122, 115, 114, 71, 403/69, 70, 67, 68, 77; 74/584

[56] References Cited

U.S. PATENT DOCUMENTS

| 2,513,637 | 7/1950 | Herreshoff et al. | 403/122 |
| 2,987,333 | 6/1961 | Lobdell | 403/122 |
| 3,034,813 | 5/1962 | Buell et al. | 403/122 |
| 3,861,812 | 1/1975 | Ito | 403/71 |

FOREIGN PATENT DOCUMENTS

| 733,351 | 7/1932 | France | 403/77 |
| 1,404,645 | 5/1965 | France | 403/68 |

Primary Examiner—Andrew V. Kundrat
Attorney, Agent, or Firm—Lawrence E. Freiburger; Robert D. Sommer

[57] ABSTRACT

An override assembly for preventing the stoppage of an actuator member if a load bearing member jams or for allowing manual override movement of the load bearing member if it is manually moved against the movement of the actuator member. The assembly includes a plastic bushing which forms a socket for a ball member formed on the end of the actuator member and a spring clip which normally maintains the ball in the socket. If a jam occurs, the spring clip allows the socket and ball to disengage one another.

3 Claims, 3 Drawing Figures

U.S. Patent    Jan. 3, 1978    4,066,369
FIG_1
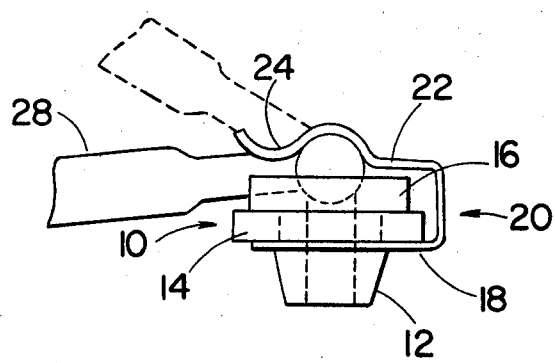
FIG_2
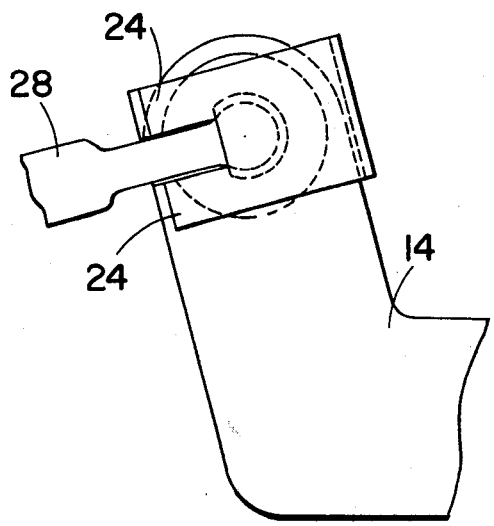
FIG_3
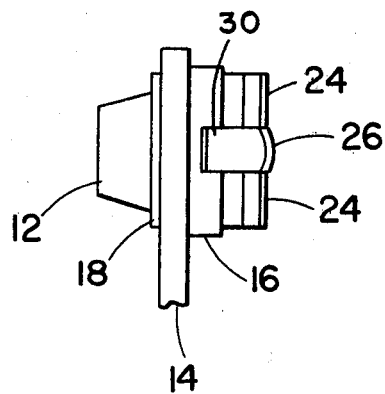

OVERRIDE CLIP ASSEMBLY

BACKGROUND OF THE INVENTION

In the prior art there are many instances where a safety override assembly is desired. For example, in automobile power door lock actuators it might be desired to manually override the door lock actuator. Sometimes in the prior art, the override assembly was built into the motorized actuator such as is shown in copending U.S. Patent Application Ser. No. 669,942, filed Mar. 24, 1976 by Reginald D. Furtah and assigned to the same assignee as the present invention.

Although the override arrangement disclosed in the above-noted Furtah application operates satisfactorily for its intended purpose, it suffers from the drawback that it is an integral portion of the motorized actuator. Thus, it is not adaptable to present door lock designs unless the entire motorized actuator assembly is used.

SUMMARY OF THE INVENTION

Thus, it is an object of the present invention to provide an override assembly in which a yieldable connection is made between an actuating member and another member in an automatic door lock actuator for an automobile.

It is a further object of the present invention to provide a safety override mechanism for an automobile door lock actuator in the form of a yieldable connection which is readily adaptable to present automobile door locking mechanisms.

These and other objects which will become apparent as the detailed description of the invention proceeds are accomplished by the present invention in the form of a plastic socket member attached to the latch member of an automobile door lock mechanism which cooperates with a ball member on the actuator and a spring clip member to provide a yieldable connection. In use, the spring clip normally biases the ball into engagement with the socket. However, if the latch member should jam, the spring clip will allow the ball and socket to disengage themselves.

BRIEF DESCRIPTION OF THE DRAWING FIGURES

In the course of describing the preferred embodiment of the invention, reference will be made to the drawing figures, in which:

FIG. 1 is an elevational view of a safety override assembly of the present invention;

FIG. 2 is a top elevational view of the safety override assembly of FIG. 1; and

FIG. 3 is a side elevational view of the socket, latch and spring clip assembly of the invention.

DETAILED DESCRIPTION OF THE PREFERRED EMBODIMENT OF THE INVENTION

In accordance with the present invention the actuator member 28 which performs a driving function and latch member 14 which is driven by the actuator member, are both adapted to be moved in substantially the same plane, with the actuator member 28 being inclined slightly toward the latch member as shown in the drawing. In their normal position, the portion of actuator member 28 immediately adjacent the ball is decreased in overall cross sectional area and is adapted to be seated in a recess 30 in the periphery of the collar 16 of bushing 10. Thus, in the position shown in the drawings in solid lines, actuator member 28 is prevented from rotating about its ball member.

Referring now to the drawing figures, the override clip of the invention is shown in conjunction with a latch lever for an automobile door lock actuator. The assembly includes a plastic bushing member 10 having a tapered truncated frustoconical section 12, a collar section 14, and a socket and collar section 16. A first leg 18 of a spring clip 20 and a latch member 14 each have an aperture therein which are each adapted to be inserted onto frustoconical section 12 against collar 16 to hold clip and latch member in place. Spring clip 20 also includes a second leg portion 22 which performs the function of holding a ball member in socket section 16. Leg portion 22 includes two fingers 24 which are separated by a cut-out 26, thus allowing an elongated integral ball and actuator member 28 to swivel up and down.

From the above description of the preferred embodiment of the invention, the operation of the override mechanism of the invention will be apparent to those skilled in the art. However, for sake of clarity, the operation of the invention will be briefly described. The purpose of actuator member 28 is to move latch member 14. The spring clip 20 will hold the integral ball on actuator 28 in socket 16 while normal movement of actuator 28 takes place so that the latch member 14 will be moved back and forth by the actuator 28. However, if latch 14 is manually or otherwise moved away from actuator member 28, spring clip 20 will allow the socket 16 to disengage itself from the ball on the end of actuator 28.

While a preferred embodiment of the invention has been described for illustrative purposes, obvious modifications will occur to those skilled in the art. Therefore, it is intended that the invention be defined in the claims.

What is claimed is:

1. A yieldable connection between an elongated driving member and an elongated driven member in which movement of the driving member in the direction of its axis causes movement of the driven member substantially along the direction of its axis;
    a bushing removably seated in an aperture in said driven member, said bushing including a tapered portion situated in said aperture, a recess in the larger end of said tapered portion, the axis of said tapered portion being substantially perpendicular to the direction of movement of said driven and driving members;
    a ball member on the end of said driving member, said ball member being seated in said recess; and
    a yieldable resilient spring clip having a first leg removably attached to said bushing and a second leg biasing said ball toward said bushing.

2. The yieldable connection as claimed in claim 1 further comprising:
    an aperture in said first leg adapted to be received on said tapered portion; and
    said second leg including a pair of resilient spaced fingers, the spacing between said fingers being sufficient to allow at least the portion of said driving member adjacent said integral ball to pass therebetween.

3. The yieldable connection as claimed in claim 1, further comprising:
    a notch in said tapered portion extending substantially at right angles to said axis of said tapered portion, said notch being of sufficient width to allow the portion of said driving member adjacent said ball to be seated therein while said ball is seated in said recess.

* * * * *